United States Patent [19]

Fukuda et al.

[11] Patent Number: 4,563,396
[45] Date of Patent: Jan. 7, 1986

[54] MAGNETIC RECORDING MEDIUM

[75] Inventors: Kazumasa Fukuda; Seitoku Saito, both of Tokyo, Japan

[73] Assignee: TDK Electronics Company Ltd., Tokyo, Japan

[21] Appl. No.: 384,762

[22] Filed: Jun. 3, 1982

[30] Foreign Application Priority Data

Jun. 3, 1981 [JP] Japan .................................. 56-86169

[51] Int. Cl.$^4$ ............................................. G11B 5/64
[52] U.S. Cl. ..................................... 428/457; 360/134; 360/135; 360/136; 427/132; 428/458; 428/694; 428/900
[58] Field of Search ................ 427/131, 132; 428/692, 428/693, 694, 900, 457, 458; 360/134-136; 204/192 M

[56] References Cited

U.S. PATENT DOCUMENTS

| 3,676,867 | 7/1972 | Bacon | 204/192 M |
| 4,172,171 | 10/1979 | Suzuki | 360/134 |
| 4,197,347 | 4/1980 | Ogawa | 360/134 |
| 4,260,466 | 4/1981 | Shinahata | 204/192 M |
| 4,309,471 | 1/1982 | Suzuki | 360/134 |

FOREIGN PATENT DOCUMENTS 0067406  6/1978  Japan .................................. 428/694

OTHER PUBLICATIONS

Matsumoto, et al., "Magnetic Properties of MnAl and MnAlCu-Evaporated Films", *J. of App. Mag. Sci. Assoc.*, vol. 5, (No. 2), 1981, pp. 145-148.

*Primary Examiner*—Ellis P. Robinson
*Attorney, Agent, or Firm*—Oblon, Fisher, Spivak, McClelland & Maier

[57] ABSTRACT

A magnetic recording medium having a Mn-Al recording layer containing at least one of Fe, Co, and Ni and having an easy magnetization axis in the perpendicular direction to the layer. The magnetic recording layer can be formed at a high speed by employing magnetron sputtering.

1 Claim, 8 Drawing Figures

MAGNETIC RECORDING MEDIUM

BACKGROUND OF THE INVENTION

1. Field of the Invention

This invention relates to a magnetic recording medium, and more particularly to a magnetic recording medium having the easy magnetization axis in the perpendicular direction to the surface of the medium and very high anisotropic energy.

2. Description of the Prior Arts

Recently, in place of a so-called in-plane type magnetic recording system of magnetizing the magnetic recording medium in the plane direction of the surface of the medium, a perpendicular magnetic recording system of magnetizing the magnetic recording medium in the perpendicular direction to the surface of the medium is being watched with keen interest and one of such systems is disclosed in, for example, Japanese Patent Publication (OPI) No. 134,706/'77.

The perpendicular type magnetic recording system has the feature that the demagnetization field becomes lower as the recording density becomes higher and hence the system is essentially suitable for super high density recording.

A medium used for the perpendicular magnetic recording system is required to have a large magnetic anisotropy in the perpendicular direction to the surface of the medium and a large coercive force and as a medium meeting these factors, it is known that the Co-Cr layer formed by high frequency sputtering method is excellent.

However, in the case of forming the Co-Cr layer by a sputtering method, it is very difficult to utilize high speed magnetron sputtering owing to the ferromagnetic property of the target itself.

SUMMARY OF THE INVENTION

The object of this invention is to overcome the foregoing problems and to provide a magnetic recording medium characterized in that the magnetic recording layer of said magnetic recording medium has larger anisotropy in the perpendicular direction to the surface of the layer, comprises Mn and Al, which are inexpensive raw materials, as the main components and at least one of Fe, Co, and Ni as a rest component, and has the easy magnetization axis in the perpendicular direction of the surface of the layer.

DETAILED DESCRIPTION OF THE PREFERRED EMBODIMENT

That is, the magnetic recording medium having a magnetic recording layer comprising 65-75% by weight Mn and 25-35% by weight Al, rest being 0-10% by weight Fe, Co, Ni, etc., having a layer thickness of frm 500 Å to 5 $\mu$m, and having an easy magnetization axis in the perpendicular direction to the surface of the layer shows an anisotropic energy, which is the most important character for a perpendicular magnetic recording medium, of $5 \times 10^6$ to $1 \times 10^7$ erg/cc, which is fairly larger than the anisotropic energy, $1-3 \times 10^6$ erg/cc of a Co-Cr layer.

The application of a sputtering method to the formation of thin layer has such remarkable merits that since the target itself for a Mn-Al series alloy layer is usually a non-magnetic material, high speed magnetron sputtering can be easily performed, the deposition speed is 1000-10,000 Å/min., which is one to two figures higher than the deposition speed, 100-200 Å/min. in the case of forming a Co-Cr layer the target itself of which is a ferromagnetic substance by sputtering, thus the technique is very excellent for mass production in industrial step, and also since the material cost for the Mn-Al layer is very lower than a Co-Cr layer, the cost for the product can be reduced.

Then the invention will be explained by the following examples.

EXAMPLE 1

While changing the composition ratio of a Mn-Al binary alloy, sputtering was performed under the following conditions:

Sputtering system: Plate magnetron type
Inlet electric power: 1 KW
Argon gas pressure: $5.0 \times 10^{-3}$ Torr
Base plate temperature: 200° C.
Background gas pressure: $<1.0 \times 10^{-7}$ Torr
Distance between electrodes: 9 cm
Layer thickness: 1 $\mu$m.

Figure 1:
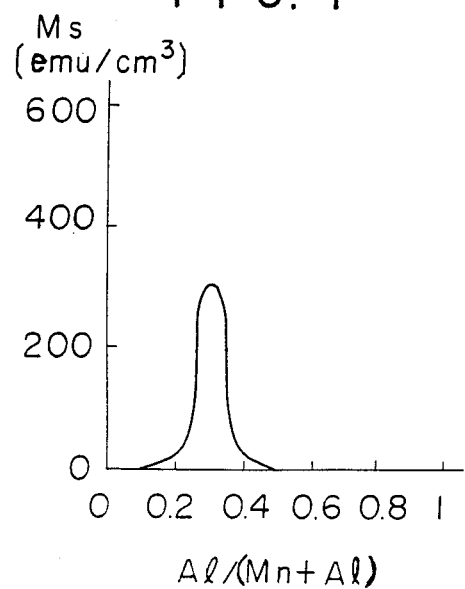
FIG. 1 is a graph showing the relation between the weight ratio of Al to Mn+Al and the saturation magnetization.
Figure 2:
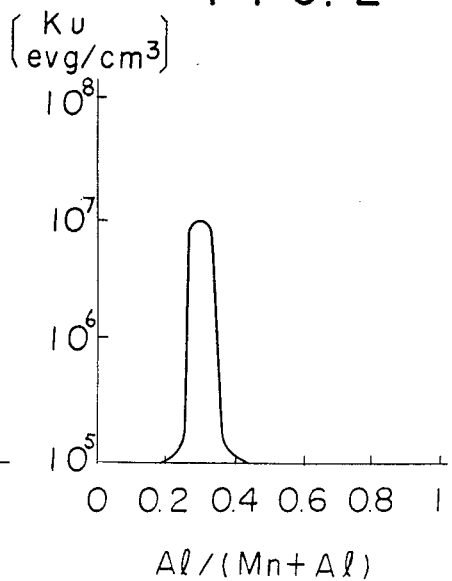
FIG. 2 is a graph showing the relation between the weight ratio of Al to Mn+Al and the anisotropic energy.
Figure 3:
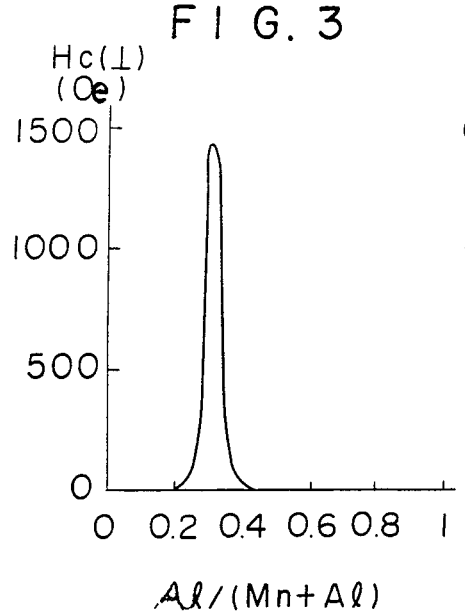
FIG. 3 is a graph showing the relation between the weight ratio of Al to Mn+Al and the coercive force.

The magnetic properties of the Mn-Al layers of various composition ratios thus obtained were measured, the results of which are shown in the accompanying drawings (FIGS. 1, 2, and 3). That is, FIG. 1 shows the change in saturation magnetization Ms. FIG. 2 shows the change in anisotropic energy Ku, and FIG. 3 shows the change in coercive force Hc ($\perp$) measured in the perpendicular direction to the layer surface.

The results show that a thin ferromagnetic layer is obtained in the range of 25-35% in the weight composition ratio of Al as is understood from FIG. 1 and in ths case, a large anisotropic energy of about $10^7$ erg/cm$^3$ and coercive force higher than 1,000 oe are obtained as is understood from FIG. 2 and FIG. 3.

Also, the deposition speed was 9,000 Å/min. in this case and hence it has been confirmed that high speed sputtering, which has never been obtained in the case of forming Co-Cr layer, is possible.

EXAMPLE 2

Figure 4:
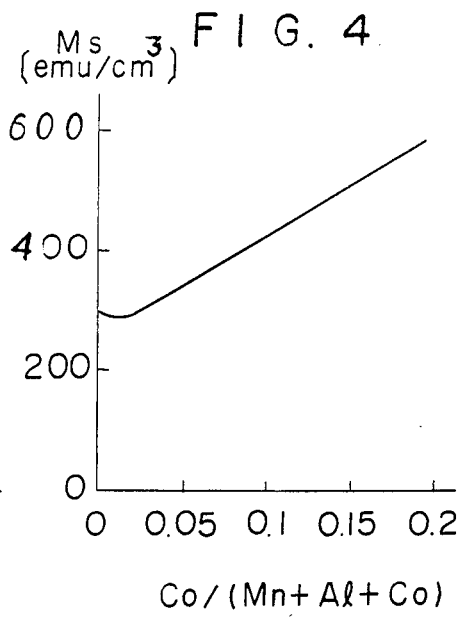
FIG. 4 is a graph showing the relation between the weight ratio of Co to Mn+Al+Co and the saturation magnetization.
Figure 5:
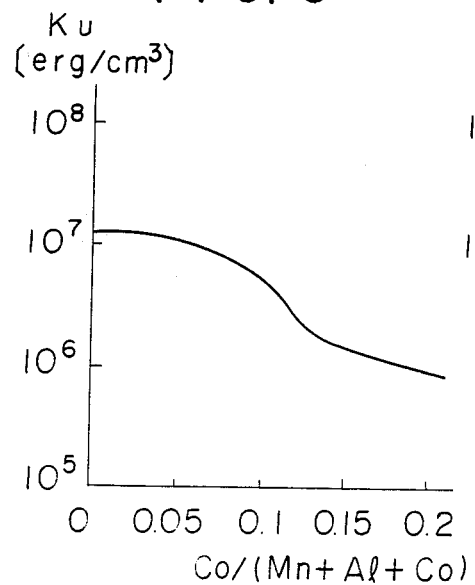
FIG. 5 is a graph showing the relation between the weight ratio of Co to Mn+Al+Co and the anisotropic energy.
Figure 6:
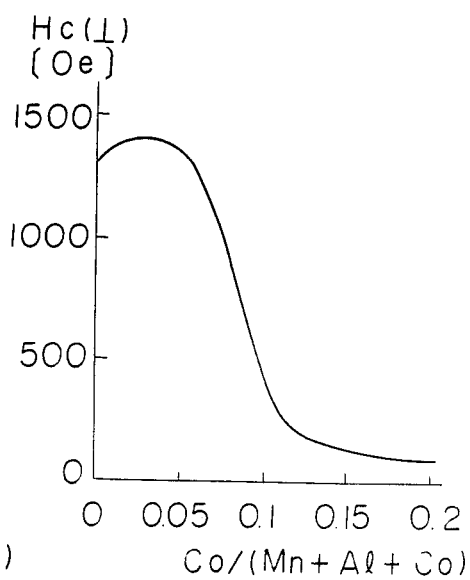
FIG. 6 is a graph showing the relation between the weight ratio of Co to Mn+Al+Co and the coercive force.

Sputtering was performed under the same conditions as in Example 1 using Mn-Al-Co alloy as the target while changing the weight ratio of Co in a range of 1-20% to the whole weight of the alloy, the composition ratio of Mn-Al being 7:3 by weight ratio, and the magnetic properties of the thin layers thus formed were measured, the results of which are shown in FIG. 4 to FIG. 6. FIG. 4 shows the change in saturation magnetization Ms, FIG. 5 shows the change in anisotropic energy Ku, and FIG. 6 shows the change in coercive force Hc ($\perp$) measured in the perpendicular direction to the layer surface.

As shown in FIG. 6, the coercive force in the perpendicular direction greatly reduced when the weight ratio of Co is over 10% by weight and also as shown in FIG. 5, although the anisotropic energy is undesirably reduced but when the weight ratio of Co is 0–10%, the coercive force and the anisotropic energy do not reduced too much and the saturation magnetization Ms increases.

The foregoing facts show that the signal to nozzle ratio (S/N) is improved in the case of using as practical magnetic recording medium, which is very preferable.

EXAMPLE 3

Figure 7:
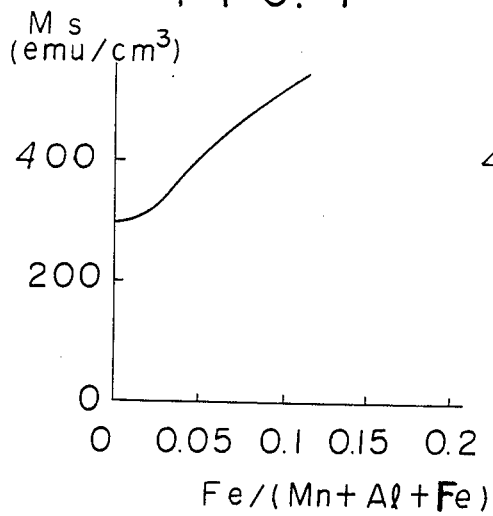
FIG. 7 is a graph showing the relation between the weight ratio of Fe to Mn+Al+Fe and the saturation magnetization.
Figure 8:
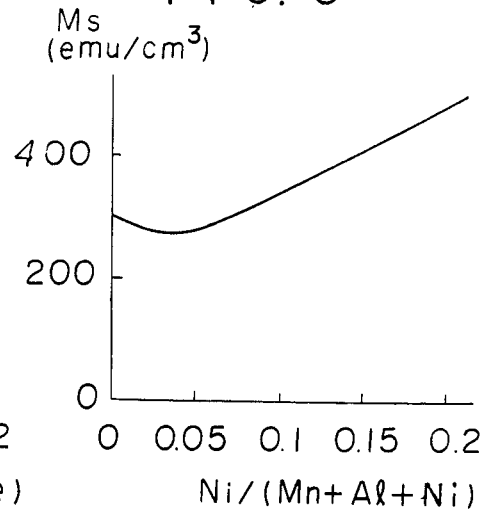
FIG. 8 is a graph showing the relation between the weight ratio of Ni to Mn+Al+Ni and the saturation magnetization.

The same experiment as in Example 2 was performed on Fe and Ni. FIG. 7 shows the change in saturation magnetization on Fe and FIG. 8 shows the change in saturation magnetization Ms on Ni.

It is understood that in the case of Fe or Ni, when the addition amount thereof is in a range of 0–10% by weight, the coercive force in the perpendicular direction and the anisotropic energy are not reduced too much and the saturation magnetization can be increased. In particular, the effect is remarkable in the case of using Fe.

Also, when the experiments were performed on the cases of using Co, Fe, and Ni respectively as well as using two or more kinds of them sumultaneously, preferred results could be obtained in the range of 0–10% by weight ratio.

In addition, when the thickness of the layer was less than 500 Å, the magnetic moment became lower and hence a sufficient S/N ratio could not be obtained in the case of using the layer as a practical magnetic recording medium. Also, the reproduction output was almost saturated at a thickness of 5 $\mu$m and no improvement was obtained when the thickness was further increased.

The invention was explained above by illustrating the preferred examples but as a matter of course, the invention is not limited to these examples and various modifications are possible in the scope of the spirit of this invention.

We claim:

1. A magnetic recording medium for perpendicular magnetic recording having a magnetic recording layer of a thickness of 500 Å to 5 $\mu$m comprising an alloy consisting essentially of Mn in a proportion of 65–75% by weight, Al in a proportion of 25–35% by weight, and a positive amount up to 10% by weight of at least one of Fe, Co and Ni, said magnetic recording layer having an easy magnetization axis in the perpendicular direction to the layer surface and having an anisotropic energy from $5 \times 10^6$ to $1 \times 10^7$ erg/cc.

* * * * *